US010338567B2

(12) United States Patent
Guimbretiere et al.

(10) Patent No.: US 10,338,567 B2
(45) Date of Patent: Jul. 2, 2019

(54) SYSTEM AND METHODS FOR THREE-DIMENSIONAL PRINTING

(71) Applicant: Cornell University, Ithaca, NY (US)

(72) Inventors: Francois Guimbretiere, Ithaca, NY (US); Sangha Im, Campbell, CA (US); Patrick Baudisch, Berlin (DE); Stefanie Müller, Berlin (DE); Serafima Gurevich, Berlin (DE); Lisa Pfisterer, Berlin (DE); Alexander Teibrich, Potsdam (DE)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 15/509,257

(22) PCT Filed: Sep. 9, 2015

(86) PCT No.: PCT/US2015/049224
§ 371 (c)(1),
(2) Date: Mar. 7, 2017

(87) PCT Pub. No.: WO2016/040507
PCT Pub. Date: Mar. 17, 2016

(65) Prior Publication Data
US 2017/0248937 A1 Aug. 31, 2017

Related U.S. Application Data

(60) Provisional application No. 62/048,073, filed on Sep. 9, 2014.

(51) Int. Cl.
*G05D 19/00* (2006.01)
*B33Y 50/00* (2015.01)
(Continued)

(52) U.S. Cl.
CPC ........ *G05B 19/4099* (2013.01); *B29C 64/386* (2017.08); *B33Y 50/00* (2014.12); *G05B 2219/49023* (2013.01)

(58) Field of Classification Search
CPC ............... G06F 17/50; G05B 19/4099; G05B 2219/49023
See application file for complete search history.

(56) References Cited

U.S. PATENT DOCUMENTS 6,772,026 B2 * 8/2004 Bradbury ............... G16H 50/50
700/98
9,333,709 B2 * 5/2016 Hartmann ............... B29C 31/02
(Continued)

OTHER PUBLICATIONS

Hack et al., "Mesh Mould Differentiation for Enhanced Performance", Proceedings of the 19th International Conference on Computer-Aided Architectural Design Research in Asia CAADRIA 2014, The Association for Computer-Aided Architectural Design Research in Asia (CAADRIA), Jan. 1, 2014.
(Continued)

*Primary Examiner* — Ronald D Hartman, Jr.
(74) *Attorney, Agent, or Firm* — Valauskas Corder LLC

(57) ABSTRACT

A fast and economical system and methods directed to low-fidelity fabrication of three-dimensional (3D) objects using 3D printing. The invention facilitates rapid prototyping by providing a wireframe structure in the form of the underlying design structure of a 3D model, which may be useful for a variety of reasons including to provide a prototype preview that may be used for design validation of a 3D model.

19 Claims, 5 Drawing Sheets

(51) Int. Cl.
*B29C 64/386* (2017.01)
*G05B 19/4099* (2006.01)

(56) References Cited

U.S. PATENT DOCUMENTS

| | | | |
|---|---|---|---|
| 9,764,544 B1* | 9/2017 | Deboard | B33Y 10/00 |
| 10,016,942 B2* | 7/2018 | Mark | B29C 70/20 |
| 10,207,454 B2* | 2/2019 | Buller | B29C 64/307 |
| 2004/0166187 A1* | 8/2004 | Fong | B29C 41/46 |
| | | | 425/130 |
| 2007/0229497 A1* | 10/2007 | Zinniel | B33Y 30/00 |
| | | | 345/419 |
| 2015/0039113 A1* | 2/2015 | Kanada | B29C 64/386 |
| | | | 700/98 |
| 2016/0271876 A1* | 9/2016 | Lower | B29C 64/106 |
| 2017/0021527 A1* | 1/2017 | Grivetti | E04G 21/04 |
| 2017/0232680 A1* | 8/2017 | Skogsrud | G05B 19/4099 |
| | | | 425/140 |
| 2017/0248802 A1* | 8/2017 | Rasschaert | B33Y 80/00 |

OTHER PUBLICATIONS

Wang et al., "Cost-effective printing of 3D objects with skin-frame structures", ACM Transactions on Graphics (TOG), ACM, US, vol. 32, No. 6, Nov. 1, 2013.
Kurt, "Free to Forge: Open Source 3D-Printed Metal Mesh Furniture", Internet, May 22, 2014.
Mueller et al., "WirePrint", User Interface Software and Technology, ACM, 2 Penn Plaza, Suite 701 New York NY 10121-0701 USA, Oct. 5, 2014.
Supplementary European Search Report, European Patent Office, dated May 15, 2018.

* cited by examiner

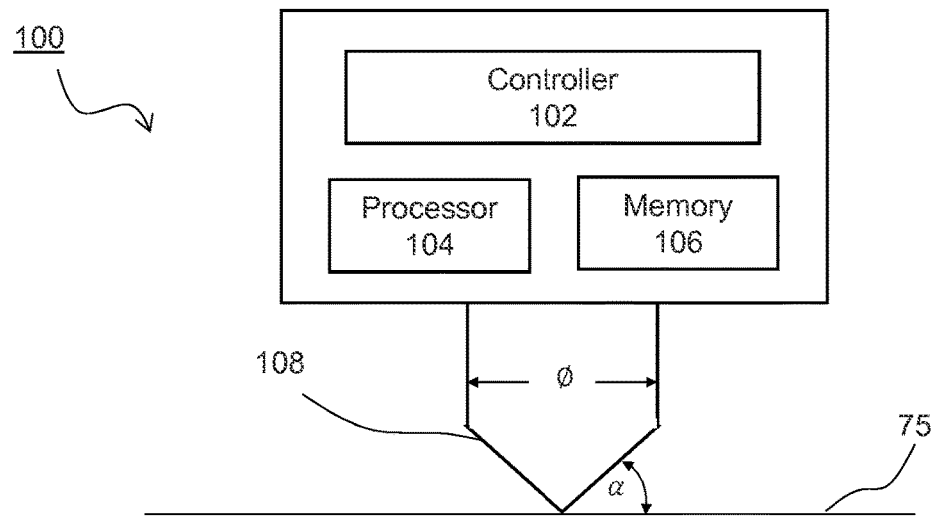
FIG. 1
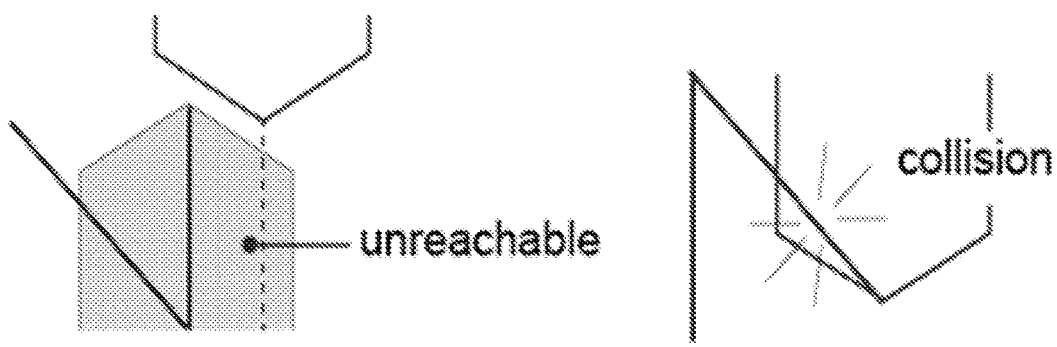
FIG. 2A  FIG. 2B intended result bending problem z-compensation straight result

SYSTEM AND METHODS FOR THREE-DIMENSIONAL PRINTING

CROSS-REFERENCE TO RELATED APPLICATIONS

This application claims the benefit of U.S. Provisional Patent Application No. 62/048,073 filed Sep. 9, 2014, incorporated by reference.

FIELD OF THE INVENTION

The invention relates generally to computer systems and methods for fabricating three-dimensional (3D) objects using 3D printing. More specifically, the invention is directed to fast fabrication (i.e., rapid prototyping) of 3D objects in the form of wireframe structures. The wireframe structures may be useful for a variety of reasons including to provide a prototype preview that may be used for design validation of a 3D model.

BACKGROUND OF THE INVENTION

Three-dimensional (3D) printing is any process used to manufacture a 3D object. For example, material may be deposited sequentially by a 3D printer (i.e., print head) to manufacture an object. 3D printers are used, for example, in industrial, educational, and demonstrative applications and are capable of manufacturing large objects as well as nanoscale-size objects. For example, 3D printing is used as a rapid prototyping tool allowing designers to prototype "one-off" objects and to iterate over designs.

Unfortunately, certain 3D printers are inherently slow by fabricating objects voxel-by-voxel and layer-by-layer. Therefore, a reasonably sized object may take a long time to print (i.e., overnight, days, etc.) slowing the design process—such as producing a single iteration per day. This supports that 3D printers used for quick design iteration is not yet entirely optimal. In other disciplines, such as in user interface design, designers achieve a fast and efficient process by iterating from low-fidelity prototyping techniques to high-fidelity techniques.

In order to allow designers to iterate quickly, low-fidelity techniques, such as sketching and paper prototyping, give priority to speed over functionality. This trade-off pays off in the early phases of design because it encourages the quick exploration of several versions before committing further resources, eventually leading to a better design.

Certain personal fabrication methods include newly proposed interfaces for a wide variety of prototype applications, for example, Printed Optics for optical sensors and display elements, Printing Teddy Bears for fabrication of soft objects for wearable technology, manufacture of free-form audio technology, and Sauron for creation of interactive controllers using a single camera. With these newly proposed interfaces, the traditional workflow remains the same in that users first create a digital model in a CAD program.

In contrast, interactive fabrication systems offer an alternative between user and system control. For instance, ModelCraft allows users to modify physical paper models by annotating directly on the model, CopyCAD allows users to copy geometry from existing objects using a milling machine, and a constructable interactive fabrication system allows users to directly draw on the work-piece inside a laser cutter using a handheld laser pointer. Different approaches try to reduce 3D printing time by either massively parallelizing the printing process using multiple heads or by assembling objects layer-wise from prefabricated voxels of equal size.

According to the typical traditional workflow, a 3D model is printed using slow hi-fidelity fabrication. In contrast low-fidelity fabrication prints all intermediate versions using fast low-fidelity fabrication creating prototype previews. Only at the end of the design process, when the design is finished, the complete 3D model is printed using hi-fidelity fabrication.

One low-fidelity fabrication approach is known as "faBrickation". This approach limits the 3D printing process to regions where high-resolution is required and substitutes less crucial portions of a 3D model with Lego-style bricks. Unfortunately, faBrickation requires manual assembly of the bricks, effectively trading in printing time for manual effort.

Therefore, there is a need for an improved 3D printing low-fidelity approach that is fully automated for fast fabrication of 3D objects. More specifically, there is a need for 3D printing of wireframe structures, which may be useful as prototypes enabling designers to preview designs for validation of a 3D model. The invention satisfies these needs.

SUMMARY OF THE INVENTION

The invention relates generally to computer systems and methods for three-dimensional (3D) printing. The invention provides a low-fidelity fabrication approach that is fully automated and fast. In particular, the invention is directed to 3D printing for fast fabrication of 3D objects in the form of a wireframe structure, which may be used as a prototype preview. The term "prototype preview" refers to a visual presentation of the underlying design structure of a 3D model, which may be useful for a variety of reasons including to provide a prototype preview that may be used for design validation of a 3D model.

More specifically, a prototype preview is constructed of a wireframe structure—a 3D printed object whose surfaces have been replaced with wireframe mesh, otherwise referred to as "mesh pattern". A mesh pattern is created by specifying each edge of the physical object where two mathematically continuous smooth surfaces meet, or by connecting an object's constituent vertices using straight lines or curves. The mesh or mesh pattern is not limited to any particular geometry or configuration.

3D wireframe structures created according to the invention allow designers to quickly validate the high-level design of a 3D object, such as its ergonomic fit. As an example, if a designer notices that a particular bottle design does not yet rest comfortably in the hand, the designer can change the model by adjusting the thickness of the bottle in a 3D modeling program. The 3D object is converted according to the system and methods of the invention and it is reprinted. The designer may repeat the process until the bottle achieves the desired fit.

3D wireframe structures according to the invention also save on material costs in that the wireframe previews use only a fraction of material required, making it affordable to iterate designs including during the early stages. It is contemplated that in addition to solely wireframe structures, hybrid structures may be fabricated that incorporate both wireframe structures and solid structures such as those fabricated using layer-wise printing. Hybrid structures allow additional detail to be printed, for example, surface features. The mix of both techniques allows for quick iteration while ensuring enough detail in those regions where it is required.

Yet it is further contemplated that certain 3D models may require closed surfaces. According to one embodiment, surfaces may be closed by dipping the wireframe structure into glue, which may also realize the added advantage of strengthening the model.

The invention advantageously can be implemented in a 3D printer, as a service, on a peripheral device in communication with a 3D printer, as a stand-alone device, or as a software program either configured with existing systems before or after market. As examples, the methods according to the invention may be configured as an option in a print dialog, a selectable control on the printer or peripheral device, to name a few.

Although the invention is described according to a 3D printing embodiment, it is contemplated the invention is applicable to other types of additive manufacturing embodiments such as extrusion and sintering based processes. More specifically, it is contemplated the invention may be used with any type of additive manufacturing including both delta design and Cartesian-based printers, for example, stereolithography (SLA), fused deposition modeling (FDM), selective laser sintering (SLS), selective laser melting (SLM), electronic beam melting (EBM), or laminated object manufacturing (LOM). In addition, any degree of freedom (DOF) is contemplated. For example, one embodiment of the invention is implemented using a 3-axis FDM printer such as those known as PrintrBot, Kossel mini, MakerBot); however, any number degree of freedom (DOF) printing device is contemplated.

According to one particular embodiment, the invention operates particularly fast on a delta design since these printers allow the print head to move up and down quickly. However, it is also contemplated that the invention be made equally fast on Cartesian printers with the proper hardware design, i.e. by changing both the movement/turn ratio and the stepper motor speed in the z-direction since the axis speed in the z-direction is simply a design decision of the manufacturers.

An advantage of the invention is that it achieves speed-ups of up to a factor of 10 compared to traditional layer-wise (i.e., layer-by-layer) printing. This is accomplished by reducing the solid model to a representation of a surface and then reducing the surface to a wireframe mesh. In particular, the volume of the object is reduced by using an efficient mesh pattern. In certain embodiments, the mesh pattern may be, for example, a "zig-zag" type pattern, but any suitable pattern is contemplated.

Although the invention may print an object layer-wise, it is a preferred embodiment of the invention that filament be directly extruded into 3D space. This creates the edges of the wireframe model directly one stroke at a time. Another advantage of the invention is that it requires less support edges than regular layer-wise 3D printing with capability of printing overhangs of up to 90°. This is accomplished by extruding material under tension.

According to the invention, objects may be constructed using any type of filament material, including for example, Acrylonitrile Butadiene Styrene (ABS), Polylactic Acid or Polylactide (PLA), high-density polyethylene (HDPL) or any suitable material that can be extruded to form the object. In particular embodiments that require frequent transitions between wireframe and solid, filament materials that have a quick transition time are preferred such as ABS that requires a smaller temperature range to change its viscosity from compliant to solid.

According to one embodiment of the invention, custom g-code is generated. G-code is the common name for the most widely used numerical control (NC) programming language. However, the invention contemplates any language in which computerized machine tools are instructed on how to make something (i.e., where to move, how fast to move, and through what path to move). In certain embodiments, the g-code is loaded into standard 3D printing software for printing. In certain other embodiments, the g-code is integrated into the 3D printing device. Specifically, the custom g-code moves the print head along the desired path and controls how much material is extruded at which points in order to fabricate a wireframe structure.

The invention and its attributes and advantages may be further understood and appreciated with reference to the detailed description below of one contemplated embodiment, taken in conjunction with the accompanying drawings.

BRIEF DESCRIPTION OF THE DRAWINGS

The preferred embodiments of the invention will be described in conjunction with the appended drawings provided to illustrate and not to limit the invention, where like designations denote like elements, and in which:

FIG. 1 illustrates an exemplary system that may be used to implement the invention.

FIG. 2A illustrates a block diagram of a collision constraint according to the invention.

FIG. 2B illustrates another block diagram of the collision constraint according to the invention.

DETAILED DESCRIPTION OF EMBODIMENTS OF THE INVENTION

Figure 3A:
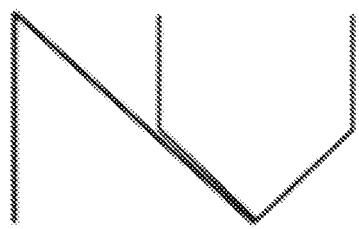
FIG. 3A illustrates a block diagram of a deformation constraint according to the invention.

Unlike traditional 3D printers that stack filament material on filament material, the invention fabricates objects by alternating between (a) printing a contour or layer and (b) printing a mesh pattern on top of the contour.

FIG. 1 illustrates an exemplary 3D printing device 100 according to the invention. 3D printing device 100 is capable of fabricating a 3D object and includes at least a controller 102, a processor 104, and a memory 106. The printing device 100 includes a print head 108 that extrudes filament material onto a support surface 75 such as a platform or plate. The device 100 uses digital data such as a CAD model.

The invention advantageously can be implemented in a 3D printer, for example, as software stored in memory 106. The software may be in the form of a program configured with existing systems either before or after market. The software is processed by the processor 104 such that the controller 102 controls the device 100, i.e., moves the print head along the desired path and controls how much material is extruded at which points in order to fabricate a wireframe structure.

The methods according to the invention can be implemented on any printing device based on the following parameters—(1) diameter $\emptyset$ of the print head and (2) angle $\alpha$ of the slanted portion of the print head. These parameters are used to determine the mesh pattern of the wireframe structure such that collisions—between filament material and/or filament material and the print head—are prevented. The printer parameters may dictate the depth the print head can reach to extrude filament material without colliding with already printed material and the distance the print head can travel to extrude filament with a spacing that avoids collisions with already printed material.

Specifically, the diameter $\emptyset$ of the print head limits the spacing between two vertical or support edges. As shown in FIG. 2A, two vertical edges need to be spaced at least half the diameter of the print head apart to avoid a collision between the print head and already printed material.

In certain embodiment the angle $\alpha$ of the slanted portion of the print head (along with the diameter $\emptyset$) may be used to determine the depth or how far the print head can reach while printing a wireframe structure without the print head colliding with that already printed:

$$\text{max depth} = \left(\frac{\emptyset}{2}\right)$$

tan $\alpha$. However, in certain other embodiments, the depth the print head can be increased beyond the max depth by using an extender element attachable to the print head. In either contemplated embodiment material cannot be extruded at a depth steeper than the slant of angle $\alpha$ or the print head itself as shown in FIG. 2B, as steeper edges can cause the slanted tip of the print head to collide with either that already printed or with that currently being printed.

Figure 3B:
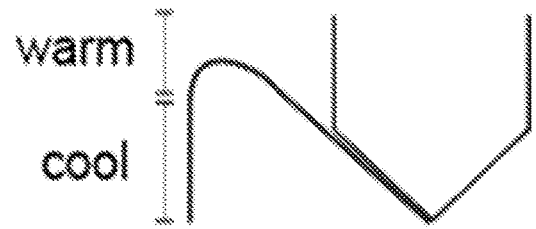
FIG. 3B illustrates another block diagram of the deformation constraint according to the invention.

FIG. 3A and FIG. 3B illustrate block diagrams of an edge deformation constraint according to the invention. Edge deformation must be considered resulting when filament material is not yet solidified during fabrication. In order to obtain the intended result in FIG. 3A, it can be seen that the filament material acting as a support edge must be cooled and solidified prior to fabricating any downward edges. This may be done by simply adding a temporal pause or delay at the end of each floating edge allowing filament material to cool and harden.

Figure 4A:
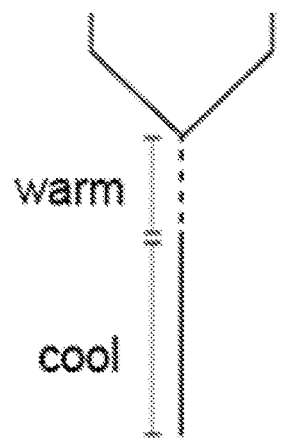
FIG. 4A illustrates a block diagram of a material transition constraint according to the invention.
Figure 4B:
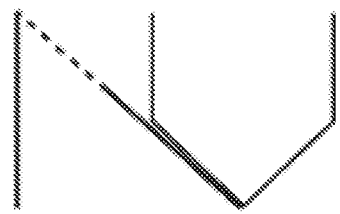
FIG. 4B illustrates another block diagram of the material transition constraint according to the invention.

In addition to compensating for edge deformation, material transition time must be considered. As shown in FIG. 4A and FIG. 4B, the invention anticipates deformation by extending the vertical movement of the print head before beginning the downward stroke to fabricate the downward edge.

The quality of the system and methods of the invention is improved by not only reducing overall speed with which the print head moves, but also allowing filament material to solidify as it is being printed. In one embodiment, this may be achieved by using an air flow to cool the material. For example, one or more air jets controllable by a solenoid valve may be attached to the print head. The additional cooling causes the filament material to solidify faster after extrusion. It is also contemplated that the air flow can be reduced or turned off such as in circumstances in which filament material needs to stick to another part of the model. Alternatively, the invention may make use of a built-in fan or integrate an additional pause to wait for material to solidify before continuing on to print the next feature. It is contemplated that a more aggressive cooling process increases speed of fabrication.

Figure 5:
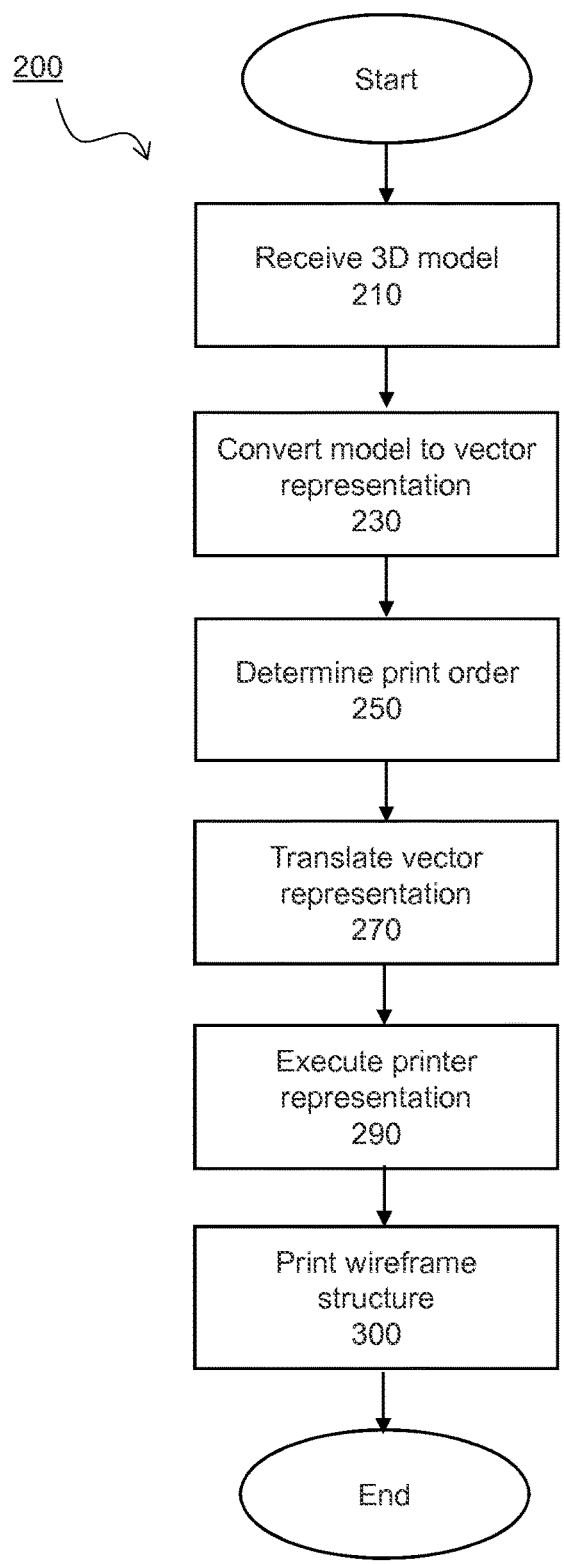
FIG. 5 illustrates a flow chart of a method according to one embodiment of the invention.

FIG. 5 illustrates a flow chart of a method 200 according to one embodiment of the invention. At step 210, a 3D model is received for processing. According to one embodiment the 3D model is in stereolithography (STL) format, but any format is contemplated such as polygon file format or a triangle format (PLY).

The 3D model is converted to a vector representation at step 230. The vector representation may include one or more points, lines, cures, polygons, etc. The vector representation is used to determine the print order of the object at step 250 as more fully discussed in reference to FIG. 6. At step 270, the vector representation is translated into g-code of a 3D printer representation of the wireframe structure based on the order for printing segments of the vector representation.

At step 290, the printer is instructed to execute the g-code to print the printer representation. At step 300, the wireframe structure is printed as strokes in 3D space. According to one exemplary embodiment, the invention creates segments by moving the print head up and down repeatedly. Specifically, the printing device extrudes filament material from the print head based on the order for printing segments to fabricate the wireframe structure. It should be noted that a larger opening in the extrusion nozzle print head leads to thicker and thus sturdier edges and thus to sturdier objects. On the flipside, thicker edges require more time to cool down, which slows down the printing process. As an example, in one embodiment a 0.7 mm extrusion nozzle provides both sturdy and fast to print results.

Figure 6:
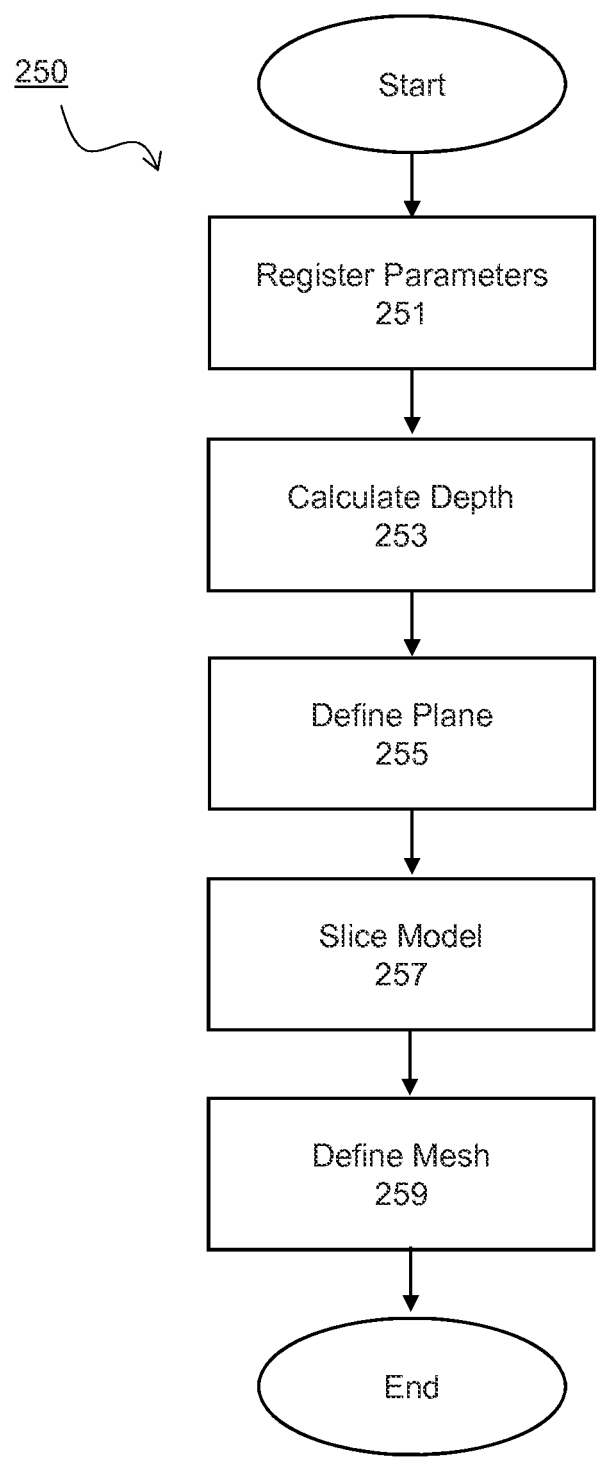
FIG. 6 illustrates a flow chart of another method according to another embodiment of the invention.

FIG. 6 illustrates a flow chart of a method 250 for determining the print order of the object according to one embodiment of the invention. Parameters of the printing device are registered at step 251. The parameters include an angle of the print head defined from a horizontal axis and a diameter of the print head. These parameters dictate the constraints of the mesh pattern used in fabricating the wireframe structure of the 3D model in order to prevent collisions with filament material during printing. More specifically, the printer parameters $\alpha$ and $\emptyset$ may dictate the depth the print head can reach to extrude filament material without colliding with already printed material and the distance the print head can travel to extrude filament material with spacing to avoid collisions with already printed material.

In particular, the parameters are used to calculate a depth at step 253 defined along a vertical axis at which the print head deposits a material and at step 255 to define a plane at the angle of the print head at which the print head deposits the material. The depth and the plane define a portion of space viable for printing the wireframe structure without collisions. As mentioned above, the depth may be increased though use of an extender element attachable to the print head At step 257, the model is sliced into segments using the depth as the maximum thickness or height of the segment (see FIG. 7). As mentioned above, the depth cannot be steeper than the slant of angle $\alpha$ or the print head itself.

The locations of the segments are determined by (1) important features on the model geometry, and (2) the minimum and maximum height of the mesh pattern between two subsequent segments. In one embodiment the invention slices the 3D model into segments along a z-axis forming horizontal slices (width and length of the object's bounding box) at a specific height using a Boolean intersect operation.

It is also contemplated the 3D model may be sliced into segments along an x-axis forming one or more vertical slices.

According to a particular embodiment, for each segment the invention extracts the top layer by converting it to a high-resolution bitmap and then applying an algorithm, for example, OpenCV's findContour. If there are multiple layers on one segment, the relationship to each other is known, i.e. whether they are located next to each other or contained in each other.

At step 259, a mesh pattern is defined. Again, the mesh pattern is determined by the parameters of the print head of the printing device. For example, as described more fully in reference to FIG. 7, the vertical or support edges of an exemplary mesh pattern have a height equal to the depth the print head can reach (also equal to the maximum thickness or height of the segment). The downward edges of the exemplary mesh pattern are limited by the angle or slanted edge of the print head. The mesh pattern is positioned between two consecutive contours or layers.

When generating the mesh pattern, the invention maximizes the object's physical stability by aligning all vertical lines across segments. Simply using the points from the segment below does not work, because subsequent segments might: (1) have a different length, which can lead to insufficient space between two subsequent points (print head collision), and (2) segments might have different heights, which can lead to invalid printing angles. Therefore, a mixed approach is used by first calculating the optimal even spacing of points for each layer and then calculating the minimum distance from a point on the bottom segment to the top segment. The average of both is used to promote good stability and a comparably homogeneous spacing. In the case where two vertical lines are still too close to each other, one is simply ignored. In addition, all geometrical modifications are implemented due to the mechanical properties of the filament material and print head such as removing the last diagonal edge of the mesh pattern from the list of edges to avoid print head collision. In other embodiments where a segment has a single contour and its subsequent segment has two contours (and vice versa), they are printed on top of each other without the intermediate mesh pattern. This particular approach may be used in instances to ensure that any mesh patter of each new segment has filament material printed underneath it.

Figure 7:
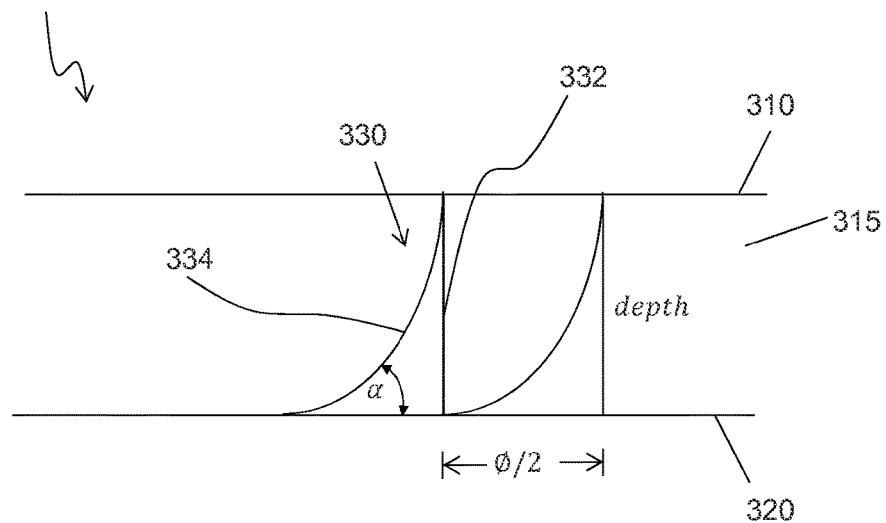
FIG. 7 illustrates a block diagram of a segment according to one embodiment of the invention.

FIG. 7 illustrates a block diagram of a segment 300 according to one embodiment of the invention. The embodiment as shown in FIG. 7 is in the form of a "zig-zag" type pattern that is triangle based, however any suitable pattern is contemplated such as one that is not triangle-based (i.e. without a support edge, for example). As shown, each segment 300 includes a first layer or contour 310 positioned from a second layer or contour 320. The distance between the contours 310, 320 is equal to the $$\text{depth} - \left(\frac{\phi}{2}\tan\alpha\right)$$

or as determined by using an extender element attachable to the print head. The surface 315 between the layers 310, 320 is replaced with the mesh pattern 330. The mesh 330 joins the first layer 310 and the second layer 320 and includes a support edge 332 connected to a downward edge 334, the downward edge 334 limited by the angle of the print head from a horizontal axis shown by α.

As mentioned above, the invention translates the vector representation into a printer representation using g-code. Specifically, a list of edges including all contours and mesh patterns are exported for printing. The coordinates for the start point and end point of each edge are used to generate the movement commands for the print head and the length of the edge to determine how much extrusion is required. Additionally, g-code is generated to command any cooling mechanism, i.e., turn the fan on/off to properly cool the wireframe edges.

As mentioned above, the invention may be used in combination with layer-wise printing to obtain a hybrid structure. This is accomplished by generating additional segments between two subsequent segments. The number of additional segments depends on the printing resolution (e.g. if two wireframe segments are 3.5 mm apart and the extrusion nozzle is 0.7 mm, the invention generates 3.5 mm/0.7 mm=5 additional layers). After generating the segments and extracting their contours, the invention analyzes which portion is selected for layer-wise printing in order to cut the contours at the start point and end point of the selected portion, the remaining which is filled with the mesh pattern.

Furthermore, whether a wireframe structure or hybrid structure, the invention prints all detail of the same segment. For example, if a segment contains multiple disconnected contours, the invention prints all contours located on the same segment first before moving up to the next segment.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for fabricating a wireframe structure of a 3D object on a surface comprising the steps of:
   providing a processor, the processor operatively connected to a controller and a print head;
   creating a wireframe mesh pattern of the 3D object;
   registering parameters of the print head, wherein the parameters include an angle of the print head defined from a horizontal axis and a diameter of the print head;
   calculating from the angle and the diameter a depth value defined along a vertical axis at which the print head is configured to deposit a material;
   defining a plane at the angle of the print head at which the print head is configured to deposit the material, the depth value and the plane defining an area for printing the wireframe structure on the surface;
   moving the print head along a path defined by both the wireframe mesh pattern and the parameters of the print head while extruding material; and
   solidifying the extruded material of a portion of the wireframe structure before continuing to extrude material of another portion of the wireframe structure of the 3D object.

2. The method according to claim 1, wherein the material is filament material.

3. The method according to claim 2, wherein the filament material is selected from the group consisting of: Acrylonitrile Butadiene Styrene (ABS), Polylactic Acid, Polylactide (PLA), and high-density polyethylene (HDPL).

4. The method according to claim 1, wherein the solidifying step further comprises the step of cooling the extruded material using an air flow from one or more air jets or built-in fans attached to the print head.

5. The method according to claim 4, wherein the solidifying step further comprises the step of pausing the print head for a period of time.

6. The method according to claim 1, wherein the moving step further comprises the step of repeatedly moving vertically the print head.

7. The method according to claim 1, wherein the wireframe mesh pattern is in a format selected from the group consisting of: a stereolithography (STL) format, a polygon file format, and a triangle format (PLY).

8. The method according to claim 1, wherein the wireframe mesh pattern is a zig-zag type pattern.

9. The method according to claim 1, wherein the method is performed up to a factor of 10 compared to traditional layer-by-layer printing.

10. The method according to claim 1, wherein the method is implemented by a 3D printer.

11. The method according to claim 10, wherein the 3D printer is one selected from the group consisting of: a stereolithography (SLA), a fused deposition modeling (FDM), a selective laser sintering (SLS), a selective laser melting (SLM), an electronic beam melting (EBM), a laminated object manufacturing (LOM), and a degree of freedom (DOF) printing device.

12. The method according to claim 10, wherein the 3D printer is one selected from the group consisting of: a delta design printer and a Cartesian-based printer.

13. The method according to claim 1, wherein the method is implemented on a device operatively connected to a 3D printer.

14. The method according to claim 1, wherein the method further comprises the step of fabricating a solid structure of the 3D object using layer-wise printing to form a hybrid structure incorporating both the wireframe structure and the solid structure.

15. The method according to claim 1, wherein the print head deposits the material as an overhang of up to 90°.

16. The method according to claim 1, wherein the creating step further comprises the step of specifying each edge of the 3D object at which two mathematically continuous smooth surfaces meet.

17. The method according to claim 1, wherein the creating step further comprises the step of connecting constituent vertices of the 3D object using straight lines or curves.

18. The method according to claim 1, wherein the depth value of the print head is a maximum value to avoid collisions with extruded material defined by:

$$\text{max depth} = (\emptyset/2)\tan \alpha$$

wherein $\emptyset$ is the diameter of the print head and $\alpha$ is the angle of the print head.

19. The method according to claim 1, wherein the creating step further comprises the steps of:
slicing the 3D object into segments, each segment defined by a first layer positioned from a second layer at a distance equal to the depth value; and
defining the wireframe mesh pattern joining the first layer and the second layer, the wireframe mesh pattern including a support edge connected to a downward edge, the downward edge limited by the angle of the print head from the horizontal axis.

* * * * *